United States Patent [19]
Edwards

[11] Patent Number: 5,918,676
[45] Date of Patent: Jul. 6, 1999

[54] HORIZONTAL TREE SAFETY VALVE

[75] Inventor: Jeffrey Charles Edwards, Aberdeen, United Kingdom

[73] Assignee: Expro North Sea Limited, United Kingdom

[21] Appl. No.: 08/663,268

[22] PCT Filed: Dec. 21, 1994

[86] PCT No.: PCT/GB94/02787

§ 371 Date: Jun. 19, 1996

§ 102(e) Date: Jun. 19, 1996

[87] PCT Pub. No.: WO95/17578

PCT Pub. Date: Jun. 29, 1995

[30] Foreign Application Priority Data

Dec. 21, 1993 [GB] United Kingdom .................... 9326062

[51] Int. Cl.⁶ ....................................................... E21B 34/02
[52] U.S. Cl. ............................................ 166/373; 166/330
[58] Field of Search ..................................... 166/344, 368, 166/373, 330, 319, 320

[56] References Cited

U.S. PATENT DOCUMENTS

| 4,325,409 | 4/1982 | Roberts | 166/72 X |
| 4,372,391 | 2/1983 | Barrington et al. | 166/373 |
| 4,560,004 | 12/1985 | Winslow et al. | 166/321 |
| 4,569,397 | 2/1986 | Brakhage, Jr. et al. | 166/321 |
| 4,577,692 | 3/1986 | Reardon | 166/321 |
| 4,703,807 | 11/1987 | Weston | 166/373 |
| 5,575,336 | 11/1996 | Morgan | 166/95.1 X |

*Primary Examiner*—Frank Tsay
*Attorney, Agent, or Firm*—Gifford, Krass, Groh, Sprinkle, Anderson & Citkowski, P.C.

[57] ABSTRACT

A safety valve for use with horizontal subsea trees as described which uses a two-part (10, 12) safety valve system. The first part (10) containing a valve mechanism (16, 18, 22, 26) remains in the wellhead and is normally biased to a closed position. The valve mechanism (16, 18, 22, 26) remains in the wellhead at all times during production and can be actuated to an open position by latching in a second part (12) which contains control cables (58) and a moveable valve actuator (62, 70, 40, 26) operable from the surface during workover to actuate the valve (18) in the wellhead portion (10) open. This provides for greater safety during the workover phase in comparison to a wire set plug and allows safer re-entry to the well.

12 Claims, 3 Drawing Sheets

HORIZONTAL TREE SAFETY VALVE

FIELD OF THE INVENTION

The present invention relates to safety valves with subsea trees and particularly horizontal subsea trees.

BACKGROUND OF THE INVENTION

The use of horizontal trees is rapidly becoming the norm for subsea completions because of the cost reduction offered over conventional technology. As subsea completions enter deep water the cost saving increases dramatically up to 25% as reported in an article entitled "Horizontal Trees Provide Quick Well Bore Access, 25% Cost Savings", edited by Leonard Le Blanc, Offshore International Magazine November 1993. Horizontal wellheads also allow for larger completions to be utilised in conventional technology, allowing a field to be exploited by fewer wells. However, the conventional method of isolating the horizontal wellhead after workover and before production, which may be a period of several years, is by situating wireline plugs in the tubing hanger. This is viewed by some major oil companies as a less than ideal method. One particular problem with this is that it is very difficult and indeed dangerous to extract the plugs prior to production. It has frequently been found that such plugs are often very difficult to remove which can add considerably to the cost of the exercise.

SUMMARY OF THE INVENTION

It is an object of the present invention to provide an improved apparatus and method for providing well isolation and to mitigate or obviate at least one of the disadvantages associated with the existing apparatus and methods.

This is achieved by using a two-part safety valve system. A first part containing a valve mechanism remains in the wellhead and is normally biased to a closed position. The valve remains in the wellhead at all times during production and can be actuated to an open position by latching in a second part which contains control cables and a moveable valve actuator operable from the surface during workover to actuate the valve in the wellhead portion open. This provides for greater safety during the workover phase in comparison to a wire set plug and also allows safer re-entry to the well.

According to one aspect of the invention, there is provided a horizontal tree safety valve system comprising, a first safety valve portion disposed in said tree and having a valve element moveable between an open and a closed position, a second safety valve portion releasably securable to said first valve portion and having a moveable valve element actuating means whereby when said first and second valve portions are secured together, said valve element actuating means is responsive to a control signal to actuate said valve element to move from a closed to an open position.

Accordingly in another aspect of the present invention there is provided a horizontal tree safety valve comprising:

a first safety valve portion containing moveable valve means located in the tree, first resiliently biased means located in said first valve portion and coupled to moveable valves means for urging said moveable valve means to a closed position, a second safety valve portion adapted to be releasably secured to said first valve portion by latch means, said latch means having respective first and second latching portions coupled to said first and second valve portions, said second valve portion having a resiliently biased element adapted to be coupled to said moveable valve means when said first and second safety valve portions are secured together, said resiliently biased element being responsive to an actuating force applied thereto to urge said moveable valve means to an open position when said actuating force is present, said first resiliently biased means and said resiliently biased element urging said valve means to a closed position in the absence of said actuating force.

Preferably said moveable valve means is an apertured ball valve, said apertured ball valve having a central throughhole when being moveable in response to an actuating force between the closed position and through 90° to the open position.

Conveniently, said first portion resiliently biased means is implemented by a coil spring.

The ball valve is located in a ball cage and the ball has a pair of slots machined in faces thereof for receiving pins about which the ball moves axially and rotatably. The slots are disposed at 45° to the axis of aperture through the ball.

Preferably the latch means is implemented by a plurality of pivotal fingers located at the bottom of said second portion and a circumferential latching profile disposed at the top of said first valve portion. Conveniently there are sixteen pivoting fingers.

The pivoting fingers are moveable radially so as to engage with the latching profile and the second valve portion includes means which are actuatable to lock said fingers in position after the first and second valve portions are engaged. Conveniently this is achieved by applying pressurised hydraulic fluid through a hydraulic port and a hydraulic line to said second valve portion which actuates a latch lock downwardly to ensure the latch fingers are secured to the latch profile thereby locking the first and second valve portions together. The latch lock can also be actuated upwardly to release the lock on the fingers to facilitate disengagement of the first and second valve portions.

Conveniently, the second valve portion contains a valve actuating member moveable between an out-of-use position whereby the valve remains closed and an in-use position whereby it engages valve carriers to locate the valve through 90° to an open position, said valve engagement means being coupled to a resiliently biased means to normally urge the engagement means out of engagement from the ball valve. A hydraulic line is coupled to the engagement means and when pressurised hydraulic fluid forces the engagement means against the resiliently biased means to overcome the resilient force and push against the ball valve seat to rotate the ball valve to an open position.

Conveniently, the latch spring and latch spring pusher are disposed concentrically about the engagement means and the resiliently biased means for engaging the ball valve.

According to another aspect of the present invention, there is provided a method of isolating a wellhead and allowing re-entry to the well comprising the steps of, providing the horizontal tree with a first valve portion having moveable valve means therein, providing a second valve portion separate from the first valve portion and providing said second valve portion with fluid control lines, engaging said first and second valve portions, and actuating a moveable element in said second valve portion to move to engage said valve means in said first valve portion whereby said valve means is moved from a closed position to an open position in the presence of an actuating force, and said first and second portions containing resiliently biased means for closing the valve and for disengaging from the valve in the absence of said force.

BRIEF DESCRIPTION OF THE DRAWINGS

These and other aspects of the invention will become apparent from the following description when taken in combination with the accompanying drawings in which.

DETAILED DESCRIPTION OF THE PREFERRED EMBODIMENTS

Figure 1:
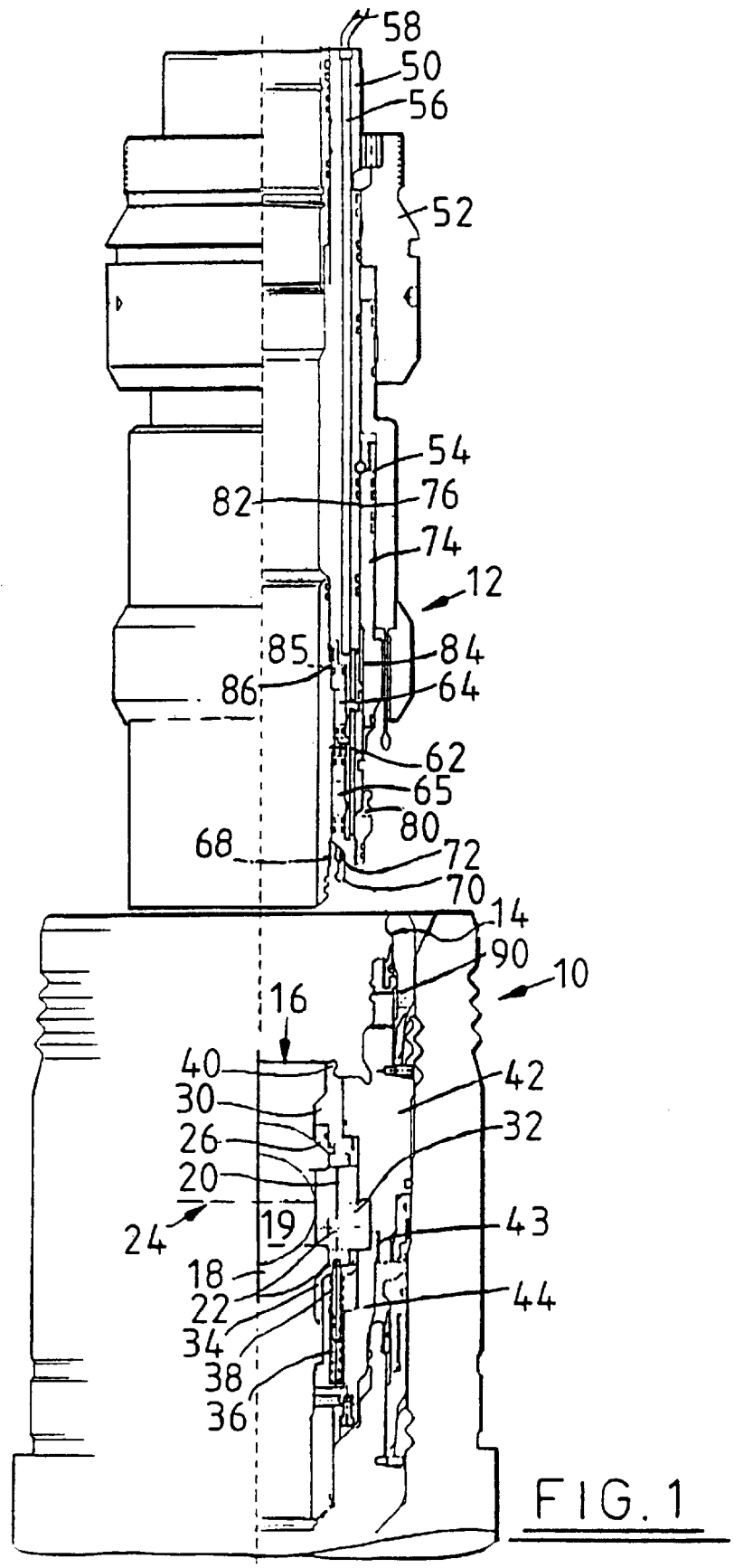
FIG. 1 is a diagrammatic representation of a horizontal tree safety valve in accordance with an embodiment of the present invention showing the first and second valve portions separately.

Reference is first made to FIG. 1 of the drawings which depicts a horizontal tree internal stack-up generally indicated by reference numeral 10 and a safety valve operator generally indicated by reference numeral 12. As will be later described in detail, it will be appreciated that the operator 12 may be removably engaged with the horizontal tree internal stack-up 10 whereby the safety valve contained in the horizontal tree can be opened and closed in accordance with hydraulic control signals from the surface.

Figure 2:
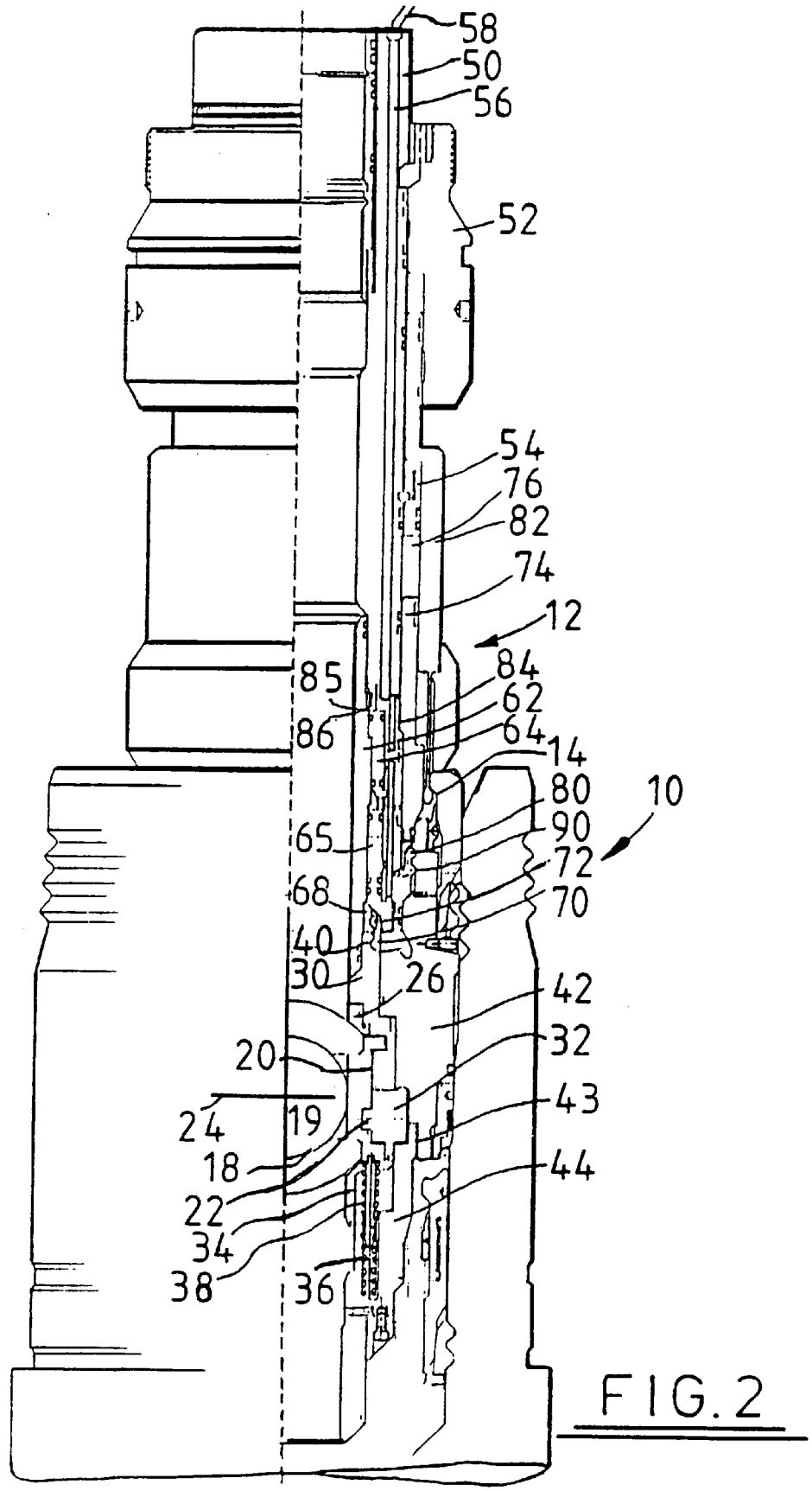
FIG. 2 shows the portions of FIG. 1 when latched together with the valve closed.

To facilitate understanding, the horizontal tree internal stack-up 10 will be first described, then the safety valve operator 12 will be described, how they combine to latch as shown in FIG. 2 will be described and then how they combine to operate and actuate the valve open or closed will also be described.

The horizontal tree internal stack-up consists of an outer housing which has an internal locking profile 14 as shown by the broken line. It will be understood that the locking profile 14 is generally unique to a particular manufacturer and will vary from manufacturer to manufacturer depending on the type of horizontal tree. It will also be understood that the internal tree stack-up provided by the invention will be varied accordingly to fit in with the particular locking profiles of particular manufacturers.

The part indicated in hatch lines is generally known as the lower or first valve portion 16, although only one half of this is shown in the split section shown in FIG. 1. In the portion 16 an apertured ball valve 18 has flat faces 20, one of which is shown, into which a slot is machined (not shown in the interests of clarity) for receiving spigots 22 (only one of which is shown) which allow the valve to be moved axially as well as to rotate about its axis 24 between an open and closed position as will be described later in detail.

The ball element 18 contacts upper seat 26. The spigots 22 extend from a fixed ball operating mandrel 32 which define with the lower valve seat carrier 34 a chamber 36 in which are disposed coil springs 38 which urge the ball valve 18 against the upper seat 26. The upper ball valve seat 26 is contained within the latch ring generally indicated by reference numeral 40 which is coupled to the ball cage 30 as best seen in FIG. 1. This combination is sealed to a structural latch cap 42 which is, in turn, secured by a threaded fastening 43 to an outer lower valve housing 44.

Figure 3:
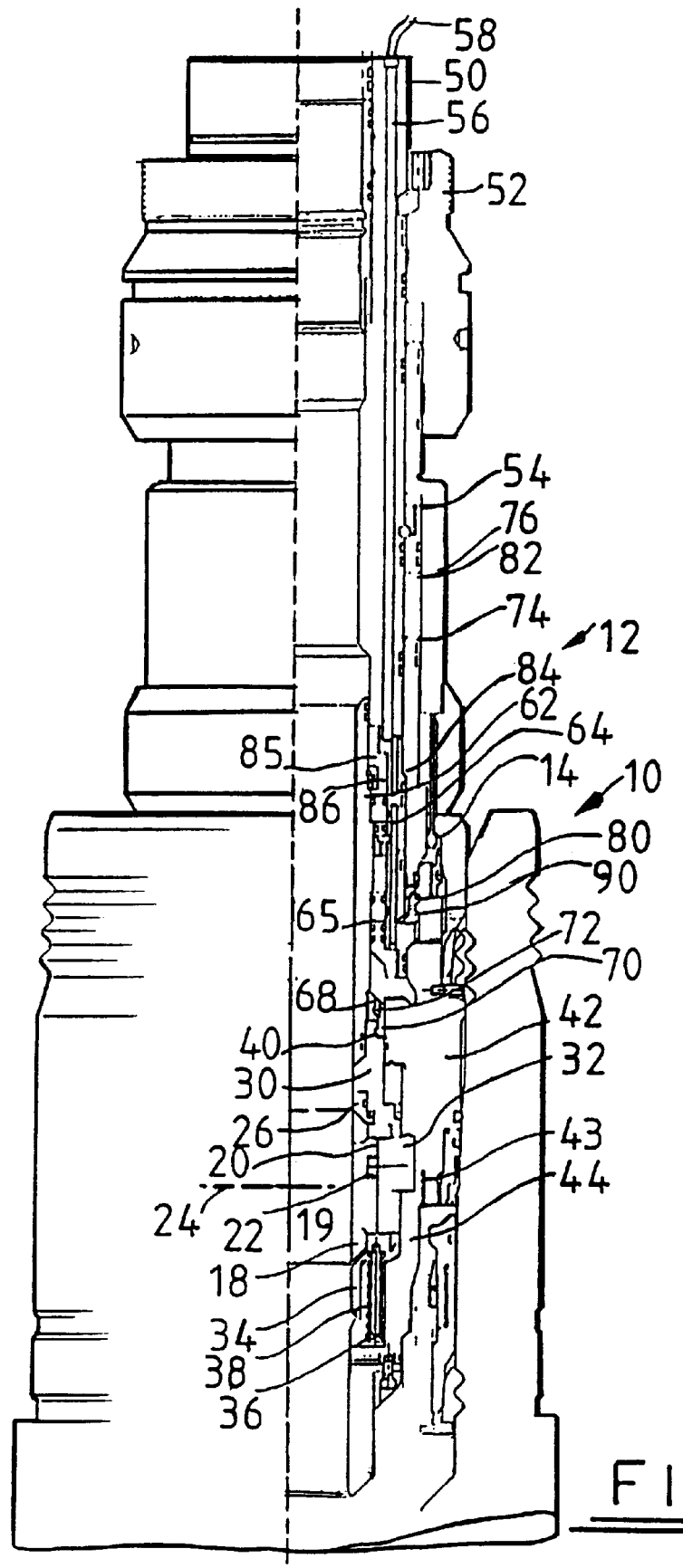
FIG. 3 is similar to FIG. 2 but shows the upper portion actuated to open the valve and the valve in an open position.

Latch housing 40, ball cage 30, ball element 18 and lower valve seat carrier 34 are moveable axially relative to spigots 22 and operating mandrel 32 and, as will be described, as ball valve is moved down axially it simultaneously rotates from the closed position shown in FIG. 1 to the closed position shown in FIG. 3.

Reference is now made to the safety valve operator generally indicated by reference numeral 12. It will be seen from FIG. 1 that this is also a split section and this is a generally tubular element which has a top sub generally indicated by reference numeral 50 which is coupled to an outer cylindrical sleeve 52. Sub 50 contains hydraulic fluid conduits 56 which are adapted to be coupled to hydraulic fluid lines 58 for receiving hydraulic fluid to actuate the inner moveable sleeve as will be later described in detail.

Top sub housing 50 defines with inner moveable sleeve 62 annular cavities 64 and 65.

A latch retaining ring 68 is disposed at the bottom of annular stage 54 and carries 16 operating latch fingers 70, only one of which is shown. Latch fingers 70 are mounted at a pivot point 72 to the ring 68 and are pivotable between a first position (the latch position shown in solid outline) and a second position (the unlatched position) shown in broken outline. The top sub housing 50 engages with a latching piston 74 which defines with the intermediate ring 54 and sleeve 50 an outer annular cavity 76. The latching piston 74 is secured to a latch locking element 80 for locking the latch fingers 70 to the latching ring 90.

In the position shown in FIG. 1, which is the unengaged position, inner moveable sleeve 62 and ring 68 are in the upward position to allow the operating latch fingers 70 to pivot freely about pivot points 72 so as to facilitate engagement with the latch ring 40 of the internal tree to provide the engaged position as best seen in FIG. 2, as will be later described in detail.

Reference is now made to FIG. 2 of the drawings which depicts safety valve portions 10 and 12 shown in FIG. 2 in an engaged position. It will be seen in this engaged position that the latch fingers 70 all engage with the latch profile 40. It will be seen in this position that no hydraulic pressure has been applied to hydraulic lines and the ball valve 18 remains in a closed position. In order to secure the coupling of the portions 10 and 12 it is necessary to apply hydraulic pressure to lock the latch fingers 70 in position. This is achieved by applying pressure via hydraulic line 58 which forces the latching piston 74 and locking element 80 outward against the spring force. Once the operator is coupled to the horizontal tree as shown in FIG. 2 the ball valve 18 can then be actuated to an open position.

This is achieved by applying hydraulic pressure via conduit 56 which causes fluid pressure to be applied to the landing 85 at the top of the internal sleeve 62 at position 86 as shown and this forces the sleeve 62 downwardly. The sleeve 62, fingers 70, profile carrier 40 and upper ball valve seat 26 are forced down past valve cap 42 against the outer surface of the ball valve 18. This forces the ball valve element axially downwards and, as described in co-pending published International Patent Application No. PCT/GB93/01110, the ball is moved via the valve slots and spigots 22 in a 45° angle path which forces the ball valve to rotate from the position shown in FIG. 2 through 90° to the position shown in FIG. 3 whereby the ball valve aperture 19 is now oriented in the vertical position allowing access through the wellhead.

It will be appreciated that the ball valve is only open as long as hydraulic pressure is applied to the lines 84. At the end of operation from the wellhead tree, hydraulic pressure to the operator 12 is stopped; springs 38 firstly force the internal sleeve 62 upwardly with the result that pressure on the ball valve element 18 is relieved and the coil spring 38 urges the bottom valve element 34 to force the valve upwardly again along the 45° path to rotate the valve from the open position back to the closed position. Simultaneously, pressure through line 82 is discontinued and pressure applied via aperture 84 urges the latching piston 74 and locking element 80 upwardly so that the contact between the locking element 80 and the top of the latching profile 90 is discontinued which allows an upward pull on the operator to disengage the latch fingers 70 from the latch ring 40 so that the operator 12 can be withdrawn to the surface leaving the wellhead closed, thereby returning to the position in FIG. 1.

Various modifications to the embodiment are hereinbefore described without departing from the scope of the invention. Firstly, it will be understood that the ball valve element may be replaced by any other suitable valve, for example a flap valve or a roller valve which can be actuated to open and close following coupling of a separate valve part. The latching mechanism may be replaced by any other suitable mechanism such as J-slots and the operator could be actuated pneumatically or electrically rather than hydraulically.

The principal advantage of the present invention is that it avoids the need for well plugs in the tubing hanger and it allows the well to be isolated after workover and before production and to be operated as and when required by simply latching into the tree with an operator section. This facilitates safer re-entry to the well.

I claim:

1. A horizontal tree safety valve system comprising,
   a first safety valve portion disposed in said tree and having a valve element moveable between an open and a closed position,
   a second safety valve portion releasably securable to said first valve portion and having a moveable valve element actuating means whereby when said first and second valve portions are secured together, said valve element actuating means is responsive to a control signal to actuate said valve element to move from said closed to said open position.

2. A valve as claimed in claim 1 wherein said moveable valve means is an apertured ball valve, said apertured ball valve having a central through-hole and moveable in response to an actuating force between the closed position and through 90° to the open position.

3. A valve as claimed in claim 2 wherein the ball valve includes a ball cage and ball, said ball having a pair of slots machined in faces thereof for receiving pins about which the ball moves axially and rotatably within the ball cage.

4. A valve as claimed in claim 3 wherein the second valve portion contains a valve actuating member moveable between amount-of-use position whereby the valve remains closed and an in-use position whereby it engages valve carriers to rotate the valve through 90° to an open position, said valve engagement means being coupled to a second resiliently biased means to normally urge the engagement means out of engagement from the ball valve.

5. A valve as claimed in claim 4 further comprising a hydraulic line coupled to the engagement means to introduce pressurised hydraulic fluid such that said pressurised hydraulic fluid forces the engagement means against the second resiliently biased means to overcome the resilient force and push against a ball valve seat to rotate the ball valve to an open position.

6. A valve as claimed in claim 4 further comprising a latch spring and latch spring pusher disposed concentrically about the engagement means and the resiliently biased means for engaging the ball valve.

7. A horizontal tree safety valve comprising:
   a first safety valve portion containing valve means moveable between an open and a closed position, wherein said moveable valve means is located in the tree, a first resiliently biased means located in said first valve portion and coupled to said moveable valve means, said first resiliently biased means urging said moveable valve means to the closed position,
   a second safety valve portion releasably secured to said first valve portion by latch means, said latch means having first and second latching portions coupled to said respective first and second valve portions,
   said second valve portion having a resiliently biased element coupled to said moveable valve means when said first and second safety valve portions are secured together, said resiliently biased element responding to an actuating force applied thereto to urge said moveable valve means to the open position when said actuating force is present, said first resiliently biased means and said resiliently biased element urging said valve means to the closed position in the absence of said actuating force.

8. A valve as claimed in claim 7 wherein said first resiliently biased means is a coil spring.

9. A valve as claimed in claim 7 wherein the latch means comprises a plurality of pivotal fingers located at a bottom of said second portion and a circumferential latching profile disposed at a top of said first valve portion.

10. A valve as claimed in claim 9 wherein the pivotal fingers are moveable radially so as to engage with the latching profile and the second valve portion includes means which are actuatable to lock said fingers in position after the first and second valve portions are engaged.

11. A valve as claimed in claim 10 wherein said actuatable means include a latch lock actuated by applying pressurized hydraulic fluid through a hydraulic port and a hydraulic line to said second valve portion which actuates said latch lock downwardly to ensure the latch fingers are secured to the latch profile thereby locking the first and second valve portions together.

12. A method of isolating a wellhead and allowing re-entry to the well comprising the steps of,
   providing a horizontal tree with a first valve portion having moveable valve means therein,
   providing a second valve portion separate from the first valve portion and providing said second valve portion with fluid control lines, engaging said first and second valve portions, and
   actuating a moveable element in said second valve portion to move to engage said valve means in said first valve portion whereby said valve means is moved from a closed position to an open position in the presence of an actuating force, and said first and second portions containing resiliently biased means for closing the valve and for disengaging from the valve in the absence of said force.

* * * * *